United States Patent Office 3,341,347
Patented Sept. 12, 1967

3,341,347
PROCESS FOR PRODUCING IRON OXIDE PIGMENTS
Clifford Jackson Lewis, Lakewood, and Eldon Ray De Ment, Golden, Colo., assignors to Southwest Enterprises, Inc., Magnolia, Ark., a corporation of Arkansas
No Drawing. Filed Oct. 16, 1963, Ser. No. 316,511
2 Claims. (Cl. 106—304)

This invention pertains to a new and novel process for producing extremely pure iron oxide pigments from low-grade, inexpensive iron ores, which pigments are nevertheless highly pure and suitable for exacting uses. This invention further relates to the controlled production of iron oxide pigments of various colors.

Various methods are well known to those skilled in the art for producing iron oxide pigments. One presently popular route is by recovering ferrous sulphate from waste pickling acids of the steel industry and then calcining this ferrous sulphate to iron oxide ($Fe_2O_3$). Still another method is to add alkalis to solutions of ferrous iron, such as copperas, in such a manner as to precipitate iron hydroxide or hydrated iron oxide, which can then be roasted to an iron oxide pigment.

It will be noted that the foregoing procedures involve the iron in a solution phase at some point in the processing and the handling of such relatively large volumes of solution, caused by the low solubility of ferrous sulphate, can be troublesome or at least costly.

Other procedures for producing less pure iron oxide pigments involve simply the addition of sulphuric acid to an iron ore or iron mineral concentrate (acid striking) followed by roasting of the acid-struck mass to the best pigment color possible. In this procedure, however, all the impurities originally present in the ore are obviously present in the finished pigment thus downgrading the pigment for many applications.

In still other cases, natural iron oxide pigments are or can be produced by simply roasting relatively pure iron ores such as limonite goethite to drive off volatile matter, thus converting the natural ore to a natural iron oxide ($Fe_2O_3$) pigment containing the original mineral impurities.

The pure form of ferrous oxide (FeO) is black whereas the pure form of ferric oxide is red. The relative proportions of these two materials in a finished iron oxide pigment therefore have an important effect on the pigment color. Moreover, it is well known that contaminants such as manganese and copper, when converted to their oxides during the roasting process, also materially affect the color of the end product pigment. Such mineral diluents ultimately affect the tinting strength of an iron oxide pigment. It is obvious, therefore, that present processes for producing iron oxide pigments must either tolerate the discoloration and dilution resulting from impurities present in the iron oxide pigment or else resort to relatively costly procedures for removing said impurities.

An object of the present invention is to make very pure iron oxide pigments from ores containing ferric iron. Another object is to prepare ferric sulphate from crude iron containing ores. Still another object of the invention is to make very pure iron oxide pigments from ferric sulphate.

Still a further object of the invention is to make a very pure iron oxide pigment from ferric iron containing ore without the necessity for relatively large volumes of solution.

These and other objects, are accomplished by the process of this invention which, briefly, comprises the following steps: (1) producing a concentrated sulphuric acid-iron ore slurry of which the iron is present substantially in the ferric form; (2) adding water to this slurry to produce a solid cement-like mass; (3) leaching the mass with water to produce a clarified solution of ferric sulphate; (4) reducing the free water content of the solution to produce a ferric sulphate sufficiently dry to be fed to a roaster; and (5) roasting the ferric sulphate under carefully controlled oxidation-reduction atmosphere to produce an iron oxide pigment of a desired color, which is then further water washed, dried and size reduced.

According to the practice of this invention, iron ore, which is essentially ferric such as limonite or goethite, is ground to pass a 100 mesh standard sieve; concentrated sulphuric acid (66° Bé) is added in an amount equivalent to at least about 80 % of the sulphuric acid needed to react stoichiometrically with the iron present and the mixture is mechanically mixed to form a liquid slurry; this slurry and water are then brought together in a mixing-pugging device such as a mixer-muller, the quantity of water being at least about 30% by weight of the slurry, and in this mixing-mulling operation, the entire system mass becomes hot, dry, and granulated; the hot granulated mass may be stored and allowed to cool. However, it has been found more expedient in terms of heat economy to next leach the granulated and reacted mass with water using conventional leaching and dewatering techniques to yield a highly concentrated solution of almost pure ferric sulphate, the amount of water being used for the leaching being such that the concentration of ferric sulphate in the resulting clarified solution is in excess of 300 grams per liter. This solution is then either evaporated to semi-dryness or fed directly into a roaster or combination spray drier and roaster, this operation being critical only to the extent that the ferric sulphate may be fed mechanically to the roasting device. The temperature of the roasting device is controlled within the range of from about 1200° F. to about 1800° F., and is preferably about 1500° F., and the rate of travel of the ferric sulphate through the roaster is preferably such that the material is in the hot zone of the roaster for at least about 45 minutes. The ferric sulphate solids resulting from this process will yield a high purity bright red pigment if the atmosphere is maintained inert during the roasting, a high purity orange pigment if the atmosphere is maintained oxidizing, and a high purity black pigment if the atmosphere is maintained reducing. Intermediate colors may also be produced, depending on the relative oxygen content of the atmosphere.

In order to produce the various colors, the oxidation-reduction potential of the roasting atmosphere is carefully controlled to produce the desired conditions. Following the roasting to convert the ferric sulphate to an iron oxide pigment, the roast product is slurried in water and water washed through a 100 mesh screen to remove any residual water soluble impurities. Finally, the water slurry of finished pigment is subjected to wet grinding and drying to obtain the finished product or is subjected to drying followed by further grinding, depending on the fineness desired in the final pigment.

The process of this invention provides for the conversion of ores containing ferric iron into high-purity red, orange, maroon, brown, and black iron oxide pigments by a simple procedure which rejects most mineral impurities, minimizes solution volumes and processing steps and permits exacting control of the relative amounts of ferrous and ferric iron in the finished product. The discovery takes advantage of a thermal dehydration step which renders most mineral impurities insoluble in a ferric sulphate solution while at the same time it takes full advantage of the extreme solubility of ferric sulphate in water. The ratio of water which is added to the concentrated sulphuric acid iron slurry to render the impurities insoluble by thermal dehydration is so controlled that the exothermic heat resulting from the addition of water is high enough to render any silica and manganese present water insoluble.

A major economic advantage in using ferric sulphate instead of ferrous sulphate to make iron oxide pigments is the saving on heat required to dehydrate the ferric sulphate. A solution of ferric sulphate can contain as much as 3,000 grams of ferric sulphate per liter of water at 20° C., whereas a solution of ferrous sulphate contains only 265 grams of ferrous sulphate per liter of water at 20° C. As previously discussed, water solutions of the latter material presently constitute one source of iron for iron oxide pigments.

The use of ferric sulphate has not only the economical advantage of requiring less heat for dehydration, but also has other advantages such as reduction in quantity of materials being handled and the ability to recover sulphur trioxide directly from the thermal decomposition of ferric sulphate (as contrasted with the release of sulphur dioxide from the thermal decomposition of ferrous sulphate).

Moreover, the use of ferric sulphate as described in the process affords another very important advantage to the manufacturer of the iron oxide pigments. This advantage resides in the ability of the highly concentrated solution of ferric sulphate to accommodate additives such as manganese dioxide powder and/or silica or silicates, lime, clay, such as kaolin and fillers generally to thus result directly without the necessity for dehydration in a solid mass which can be roasted to produce pigments whose colors, tinting strength and other properties represent commercial pigment products of controlled iron content. For example, siennas represent a group of iron oxide base pigments in which the exides of iron are mixed with considerable clay. Another class of pigments known as umbers have manganese present, usually in the clay acting as the diluent. By taking advantage of the relatively high concentration of the ferric sulphate solution used in our process, it is possible to produce many shades of color by the addition of fillers of various compositions to the ferric sulphate solution and in the process of adding such fillers to produce an essentially solid or semi-solid mass which can be fed directly to the roasting furnace without the need for drying or otherwise removing the water in which the ferric sulphate has been dissolved. Pure salts of such metals as manganese, e.g. $MnSO_4$ and $MnCO_3$, chromium, e.g. $Cr_2(SO_4)_3$, lead e.g. $PbS$, and copper, e.g. $CuSO_4$; $CuS$ and $CuCO_3$, can also be added to the highly concentrated ferric sulphate solution of our process to result in an intimate mixture of any or all of these metals with the iron and which highly concentrated mass can then be spray-dried or otherwise dewatered prior to being fed to the roasting operation. The color of the pigment is substantially influenced by the relative ratio of iron and additive in the finished pigment product. By this procedure other iron base pigments and colors are produced, their properties again being different from those of the pigments resulting from roasting with the pure ferric sulphate or the solid mass resulting from the addition of fillers and diluents as just described. Obviously, such procedures would be impractical if not impossible if applied to the solutions of ferrous sulphate in which the iron content is relatively dilute because of the limited solubility of ferrous sulphate in water.

Another advantage of the process is that the sulphur values evolved during the roasting operation can be recovered as sulphuric acid for recycling.

Furthermore, whether the pure ferric sulphate feed to the roasting furnace or ferric sulphate containing additives is employed as just described, the control of the oxygen content in the atmosphere of the roasting zone is more critical than the temperature of the roasting. The color of the resulting pigment product after roasting can be faithfully reproduced by control of the relative oxygen content in the environment surrounding the roasting furnace feed during its conversion to pigment by thermal decomposition.

The use of ferric sulphate will be elaborated more fully in the example. However, it should be understood that the technique therein described is also equally applicable to ferric sulphate material whether the feed material to the calcining or roasting oven is diluted with gangue material in the ore or whether it is pure ferric sulphate product to which other materials as just described have been added. Therefore, if an iron ore in which all the iron is essentially in the ferric state is treated with sulphuric acid and water, the resulting reaction produces a hard solid mass, the heat attending this reaction dehydrates any silicic acid and manganese salts which may be formed so that these materials are insoluble when the resulting solid cement-like mass is water leached. Furthermore, water leaching of the ferric sulphate thus formed can result in a solution containing in excess of 24,000 present, thus yielding a highly concentrated solution whose subsequent evaporation costs are relatively low.

The following example illustrates the best mode contemplated for carrying out his invention:

EXAMPLE

One hundred pounds of a goethite ore ($Fe_2O_2 \cdot H_2O$) containing 55% Fe was thoroughly admixed with $H_2SO_4$ in quantity sufficient (104 lbs.) to react with 80% of the contained iron. The concentrated sulphuric acid-iron ore slurry was agitated until it had become a whitish-gray color, and water was added in stoichiometric amount (40 lbs.) to produce $FE_2(SO_4)_3 \cdot 9H_2O$. Considerable heat was evolved and the fluid mass became yellow-gray in color. The mass, upon cooling, solidified. This solidified was broken up and subjected to water leaching with hot water in amounts to produce about 1500 grams $Fe_2(SO_4)_3$ per liter of solution. The resulting leach was filtered, and the clear filtrate was evaporated to a dry solid state. The recovered solids from the filtrate weighed 212 lbs. or 85.0% recovery of Fe from the feed material, based on pure $Fe_2(SO_4)_3 \cdot 9H_2O$ in the solids. The rejected solids from filtration weighed 30 lbs. and contained 27.0% Fe. After evaporation, the solids were divided into portions and the separate portions were subjected to calcining under varying furnace temperature and furnace atmosphere. Table 1 shows the conditions and yields of the calcined solids.

TABLE 1

| Furnace Atmosphere | Furnace Temperature, ° F. | $SO_3$ percent in off gas | Color of Calcined Pigment |
|---|---|---|---|
| Oxidizing ($O_2$) | 1,200 | 91.1 | Orange. |
| Do | 1,400 | 90.8 | Do. |
| Do | 1,600 | 91.0 | Do. |
| Do | 1,800 | 91.3 | Do. |
| Inert ($CO_2$) | 1,200 | 50.2 | Red. |
| Do | 1,400 | 50.4 | Red. |
| Do | 1,600 | 50.0 | Red. |
| Do | 1,800 | 50.2 | Red. |
| Reducing (CO) | 1,200 | 19.6 | Black. |
| Do | 1,400 | 18.8 | Do. |
| Do | 1,600 | 19.0 | Do. |
| Do | 1,800 | 19.2 | Do. |

As may be seen from the table above, the temperature of calcination had no visible effect on the color produced, so long as the furnace atmosphere was controlled. Variation of the atmosphere, as shown, produced pigments ranging from orange through red to black.

Analysis of both feed and pigment showed rejection of most contaminants as shown in Table 2.

TABLE 2

| | Percent | | | | | | |
|---|---|---|---|---|---|---|---|
| | $Fe_2O_3$ | P | Mn | Ca | Mg | $SiO_2$ | Al |
| Ore Feed | 78.8 | 0.10 | 0.071 | 0.01 | 0.01 | 9.0 | 5.5 |
| Pigment | 99.6 | 0.02 | 0.01 | 0.01 | 0.01 | 0.022 | 0.24 |

As may be seen from Table 2, the impurities in the material was greatly decreased. Of course, Ca and Mg showed no decrease. However, the decrease in content of the other impurities were: Al—77.45%; Mn—85.91%; P—80%, and $SiO_2$—99.75%.

While the invention has been described with reference to certain specific examples, it is, of course, to be understood that the invention is not to be limted thereby except insofar as appears in the accompanying claims.

We claim:

1. A process for preparing iron oxide pigments of a controlled color from iron ores containing silica and manganese in which the iron is present substantially in the ferric form which coprises producing a concentrated sulphuric acid slurry of said iron containing ore, by adding concentrated sulphuric acid in an amount equivalent to at least about 80% of the sulphuric acid needed to react stoichiometrically with the iron product and mixing to form a slurry, adding water to said concentrated sulphuric acid iron slurry, mixing until the entire mass becomes hot, dry and granulated, said water being added in an amount such that the exothermic heat resulting from said addition is sufficient to render the silica and manganese present water insoluble, rendering impurities insoluble by thermal dehydration and leaching said mass with water to produce a clarified solution of ferric sulphate having a concentration in excess of 300 grams per liter and reducing the free water content of said solution to produce ferric sulphate sufficiently dry to be fed to a roaster and roasting said ferric sulphate at a temperature within the range from about 1200° F. to about 1800° F., at a residence time of at least about 45 minutes and obtaining an iron oxide pigment having a color that is faithfully reproducible and primarily dependent on the roasting atmosphere and controlled by the relative oxygen content surrounding the roasting furnace feed during its conversion to pigment, reducing atmosphere giving black pigment, inert atmosphere giving red pigment and oxidizing atmosphere giving orange pigment.

2. The process as described in claim 1 in which pure salts of metals are added to the ferric sulphate prior to roasting to influence the color of the resulting pigment.

References Cited

UNITED STATES PATENTS

| 1,489,347 | 4/1924 | Davison | 23—200 |
| 1,983,274 | 12/1934 | Earle | 75—115 |
| 2,452,608 | 11/1948 | Smith | 106—304 |
| 2,805,939 | 9/1957 | Schaufelherger | 75—115 |

OTHER REFERENCES

Kirk-Othmer: "Encyclopedia of Chemical Technology Interscience," New York, 1953, vol. 10, pages 632–634.

Berling: "Oxide of Iron Pigments," Canadian Chemistry and Industry, January 1931, pp. 16–18.

TOBIAS E. LEVOW, *Primary Examiner.*

HELEN M. McCARTHY, *Examiner.*

S. E. MOTT, *Assistant Examiner.*